United States Patent
Cwikowski et al.

Patent Number: 5,325,527
Date of Patent: Jun. 28, 1994

[54] CLIENT/SERVER COMMUNICATION SYSTEM UTILIZING A SELF-GENERATING NODAL NETWORK

[75] Inventors: Randy A. Cwikowski, Dana Point; Hien Tang, Orange, both of Calif.

[73] Assignee: Canon Information Systems, Inc., Costa Mesa, Calif.

[21] Appl. No.: 5,449

[22] Filed: Jan. 19, 1993

[51] Int. Cl.⁵ ............................................. G06F 13/00
[52] U.S. Cl. .................... 395/650; 395/200; 364/DIG. 1; 364/284.4; 364/229.41; 364/242.94
[58] Field of Search .............................. 395/200, 650; 364/DIG. 1

[56] References Cited

U.S. PATENT DOCUMENTS

| | | | |
|---|---|---|---|
| 4,835,673 | 5/1989 | Rushby et al. | 364/DIG. 1 |
| 5,001,628 | 3/1991 | Johnson et al. | 364/DIG. 1 |
| 5,151,989 | 9/1992 | Johnson et al. | 395/200 X |
| 5,163,131 | 11/1992 | Row et al. | 364/DIG. 1 |

Primary Examiner—Thomas M. Heckler
Attorney, Agent, or Firm—Fitzpatrick, Cella, Harper & Scinto

[57] ABSTRACT

Method for building a self-generating nodal network for communicating in a client/server system wherein the method includes the steps of creating a server nodal network tree which includes the steps of generating a server root node which includes both process steps for communicating to an operating system and service nodes, and process steps for building service nodes which correspond to servers within the client/server system, each service node includes both process steps for advertising a service to the server root node and process steps for building a topic node which includes both process steps for accessing a server and process steps for building a job node for storing a job request. The method also includes the step of creating a client nodal network tree which includes the steps of generating a client root node which includes both process steps for communicating to an operating system and client service nodes, and process steps for building client service nodes corresponding to each service node of the server nodal network tree, each client service nodes includes both process steps for communicating to an application program and process steps to create a job request in accordance with a job request designated by the application program, wherein the client service node is receiving a job request from the application program propagates the request back through the client nodal network tree to the server nodal network tree for execution.

18 Claims, 5 Drawing Sheets

CLIENT/SERVER COMMUNICATION SYSTEM UTILIZING A SELF-GENERATING NODAL NETWORK

BACKGROUND OF THE INVENTION

1. Field of the Invention

The present invention pertains to a method and apparatus for managing communication in a client/server system utilizing a self-generating nodal network. More specifically, the present invention relates to a collection of specialized network node types that when generated and connected together form a nodal network which provides a client with access to a server device in a network.

2. Description of The Related Art

Application programs executed on today's computing equipment rarely possess all the functionality that is required for the application program to execute a task fully. That is, most application programs rely on other libraries to provide parameters to access a peripheral device in order to execute a function. For example, if a user requests a printing operation to be performed by an application program, both the user and at least one stored library of printing parameters and task information must be accessed in order for that application program to fully execute the request. Traditionally, upon initialization of an application program, the user is prompted to enter certain parameters for each peripheral device used with the system. This information is stored in separate files for each individual peripheral device. In addition, once a user has requested a service to be performed by the application program, the user must designate the server (peripheral device) to perform the function as well as designating scheduling when to perform the task. Thus, when the application program is requested by the user to perform a function utilizing a peripheral device, the application program must first obtain the destination and scheduling of the task from the user and, second, the program application must access additional parameter information regarding the task and the peripheral device from an external library or file.

Heretofore, it has not been possible for an application program simply to perform a task without having to access further information in order to carry out the requested task. Consequently, conventional application programs have complex as well as different interface processes for accessing a peripheral device. In addition, application programs must access additional information from external libraries and in some instances the user in order to carry out a requested task.

SUMMARY OF THE INVENTION

It is the object of the present invention to address the foregoing difficulties.

The invention provides a self-generating nodal network client/server communication system which provides an interface to an application that manages the complex and different interfaces between peripheral device servers. In this aspect, the invention is a method for building a self-generating nodal network for communicating in a client/server system, the method comprising the steps of creating a server nodal network tree which includes the steps of generating a server root node which includes both process steps for communicating with an operating system and with service nodes and process steps for building service nodes which correspond to servers within the client/server system, each service node includes both process steps for advertising a service to the server root node and process steps for building a topic node which includes both process steps for accessing a server and process steps for building a job node for storing a job request. The method further includes the step of generating a client root node which includes both process steps for communicating with the operating system and with client service nodes and process steps for building client service nodes corresponding to each service node of the server nodal network tree, each client service nodes includes both process steps for communicating with an application program and process steps to create a job request in accordance with a job request designated by the application program. The client service node receives a job request from the application program and propagates the request back through the client nodal network tree to the server nodal network tree for execution.

By virtue of the above arrangement, the client-side interface with a peripheral device can be simplified since the nodal network of the present invention manages the interface in order to execute the requested task after the client has issued a request to perform the task.

DETAILED DESCRIPTION OF THE PREFERRED EMBODIMENT

Figure 1:
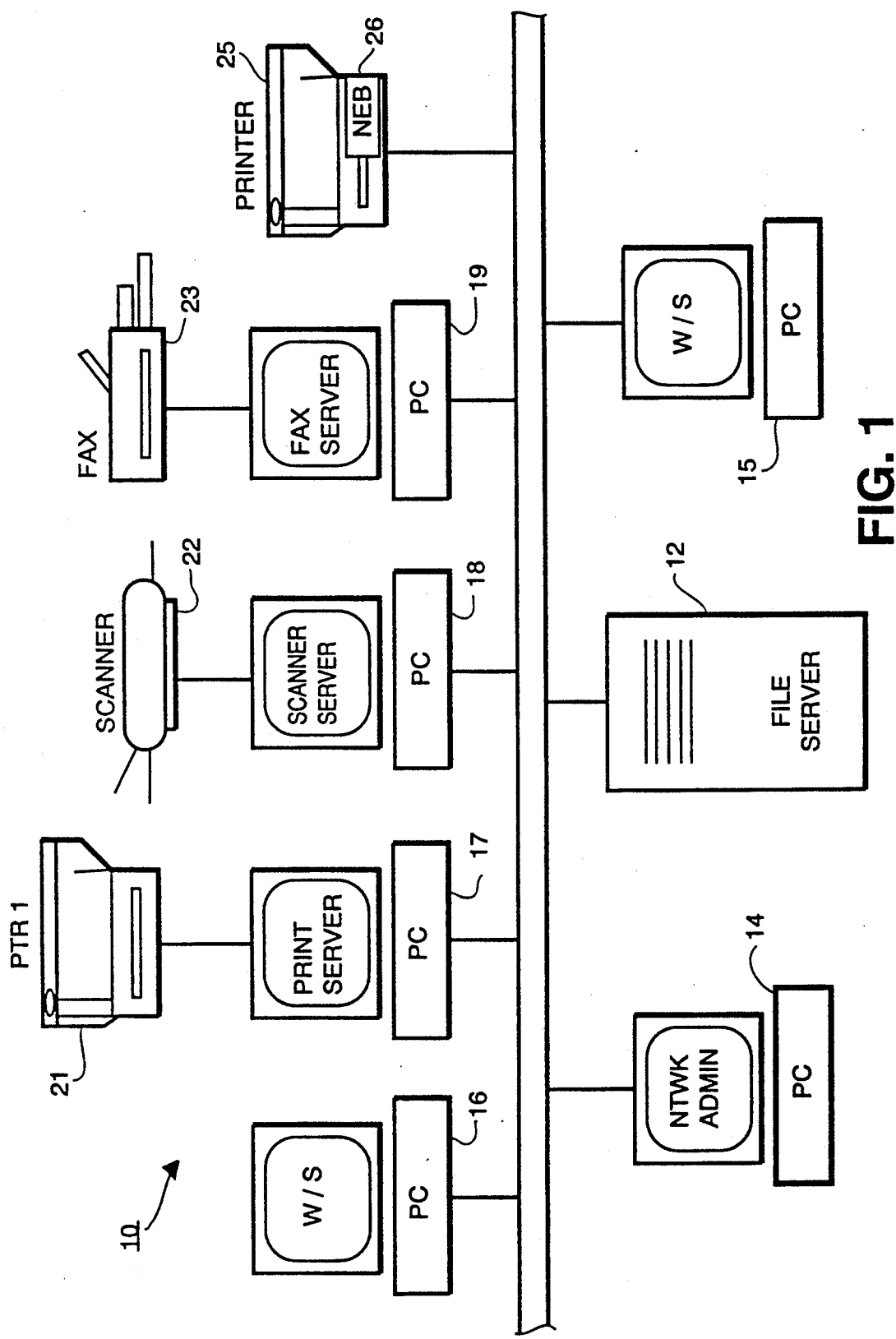
FIG. 1 is a representational view of a local area network according to the present invention.

FIG. 1 is a representational view of a local area network ("LAN") 10 according to the invention. As seen in FIG. 1, LAN 10 includes LAN communication bus 11 such as EtherNet, for carrying LAN communications among the network devices attached to the bus. File server 12 is attached to LAN bus 11 and acts as a file manager for receiving, storing, queuing, caching, and transmitting files between LAN devices. File server 12 typically includes a large capacity memory storage device, such as a 10 gigabyte hard disk, for performing its file manager duties. File server 12 operates under a network operating system such as NetWare ®.

Also attached to LAN bus 11 are work stations 14, 15, 16, 17, 18 and 19 which in this case are shown as personal computing equipment such as IBM PC or PC-compatible computer. Work stations 14–16 are network user work stations and includes various application programs such as word processing application programs, spreadsheet application programs, optical character recognition application programs, and other information and data processing programs. Those programs may be stored physically in work stations 14–16, or they may be retrieved for execution at those work stations from file server 12.

Work stations 17-19 are peripheral server work stations and are used primarily to provide network services for the peripherals for which they are connected. Thus, work station 17 is a print server work stations and provides network services for printer 21. Likewise, work station 18 is a scanner server work station and provides network services for scanner 22, and work station 19 is a facsimile server work stations and provides network services for facsimile 23. Other peripheral devices may also be connected to the network, and it is possible for a single work station to service more than one peripheral device. In particular, it is possible for work station 17 to service more than one printer, and it is possible, with appropriate equipment, for a single work station to service a variety of different types of devices.

While it is ordinarily necessary to provide a dedicated work station to service one or more peripheral devices, in some instances this is not necessary. Thus, for example, printer 25 is connected directly to LAN bus 11 via network expansion board 26 which provides the necessary print server functions without the necessity of dedicating a work station for those printer services.

Other devices may be connected to LAN 10 and indeed LAN 10 may be connected as part of a wide area network ("WAN") to various backbone and transponder connectors. These arrangements are well known to those skilled in the art and are omitted in the interest of brevity.

Figure 2:
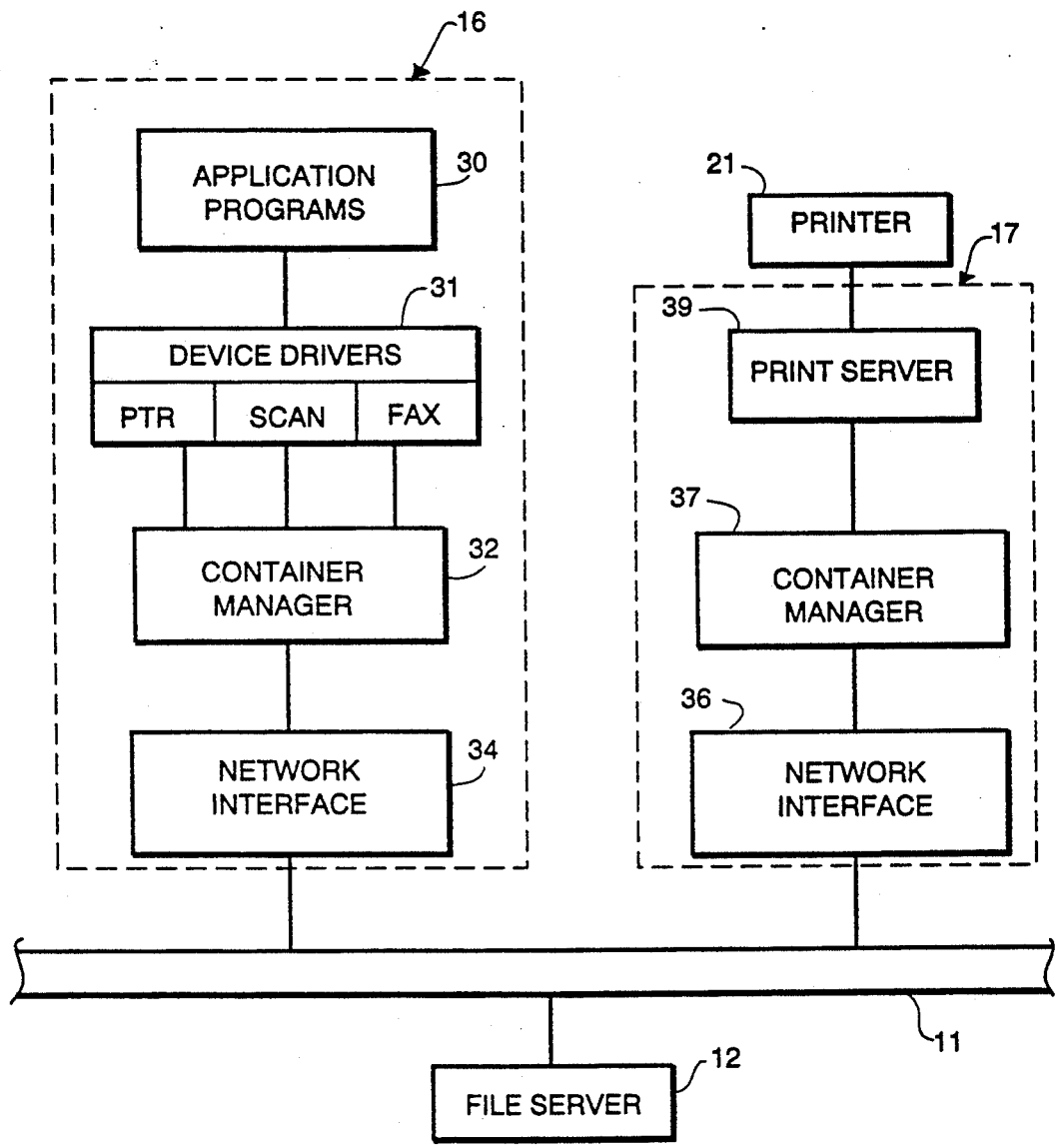
FIG. 2 is a functional block diagram of network communications between a first computer process comprising an application program executing in a first network station, and a second computer process comprising a print server executing in a second network station.

FIG. 2 is a functional block diagram showing information exchange according to the present invention. In FIG. 2, information exchange is illustrated between a first computer process such as an application program executing from one of the work stations illustrated in FIG. 1 (here, work station 16), to a second computer process such as printer server executing on work station 17. It is to be understood that the computer processes illustrated in FIG. 2 are representative only; information exchange can take place between any of the devices illustrated in FIG. 1 such as between work stations 15 and 16 or between one of the work stations in either of the scanner server work station 18 or the facsimile work station 19. Moreover, information exchange shown in FIG. 2 is illustrated between different work stations on a local area network where the need for flexible task handling is the most critical. It is to be understood, however, that task handling according to the invention may occur between different computing processes within the same work station, for example, between a word processing application program that is importing numerical data and a spreadsheet processing application program which is providing the numerical data.

In the course of execution of an application program, the services of a peripheral device are required. The application program obtains those services via a single device driver 31 such as printer driver, scanner driver, or a facsimile driver. The device driver, in turn, acts as the device which communicates between an application program and a peripheral server.

In general, the present invention provides the ability to schedule tasks for peripheral devices 21, 22, 23 and 25 on a real time basis. The present invention dynamically configures itself via an initialization file to support additional peripheral devices. Accordingly, when an application program needs access to one of the peripheral devices, the program requests access via a nodal network of the present invention.

Figure 4:
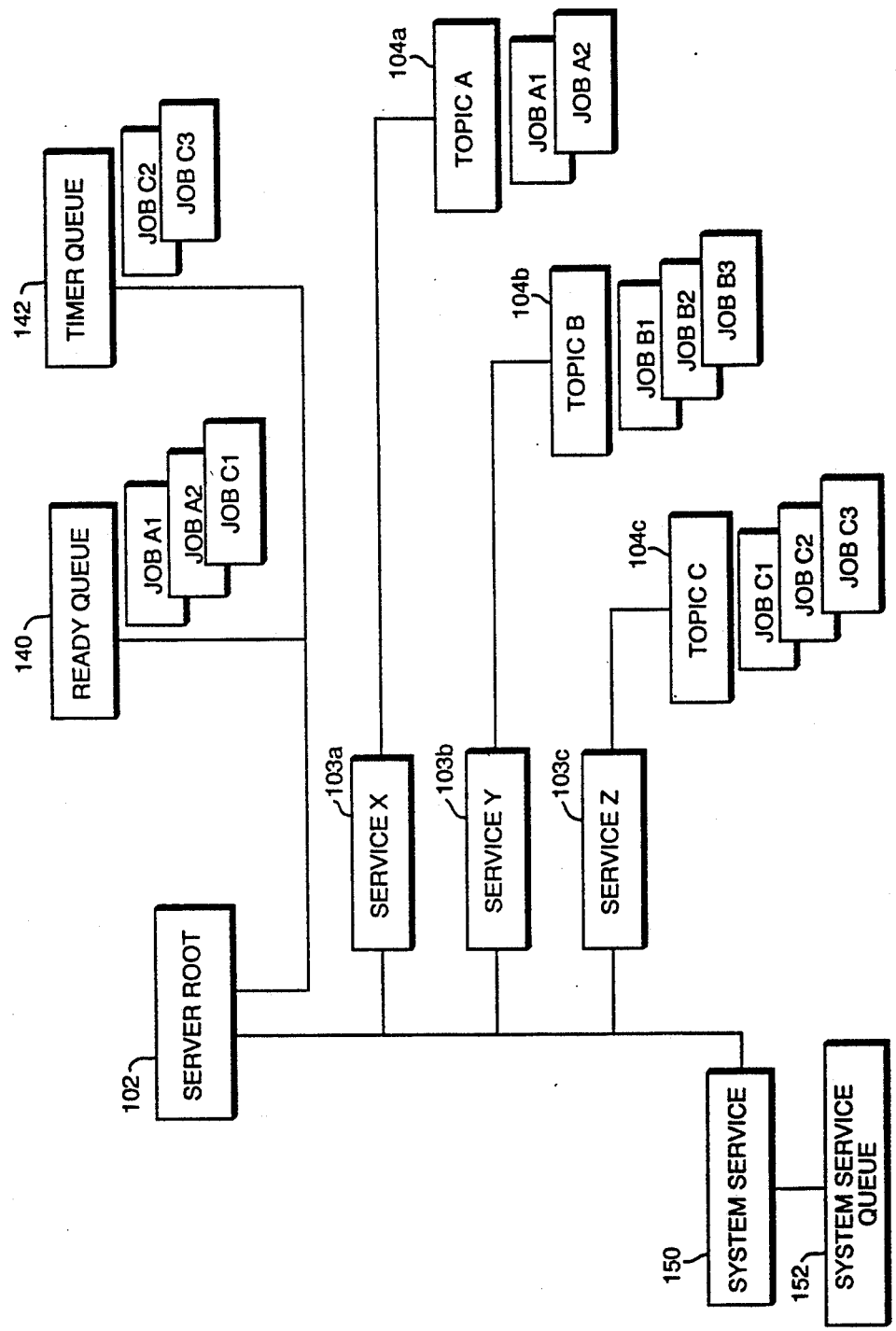
FIG. 4 is a representational view of the server nodal network tree provided with a ready-queue and a timer-queue.
Figure 5:
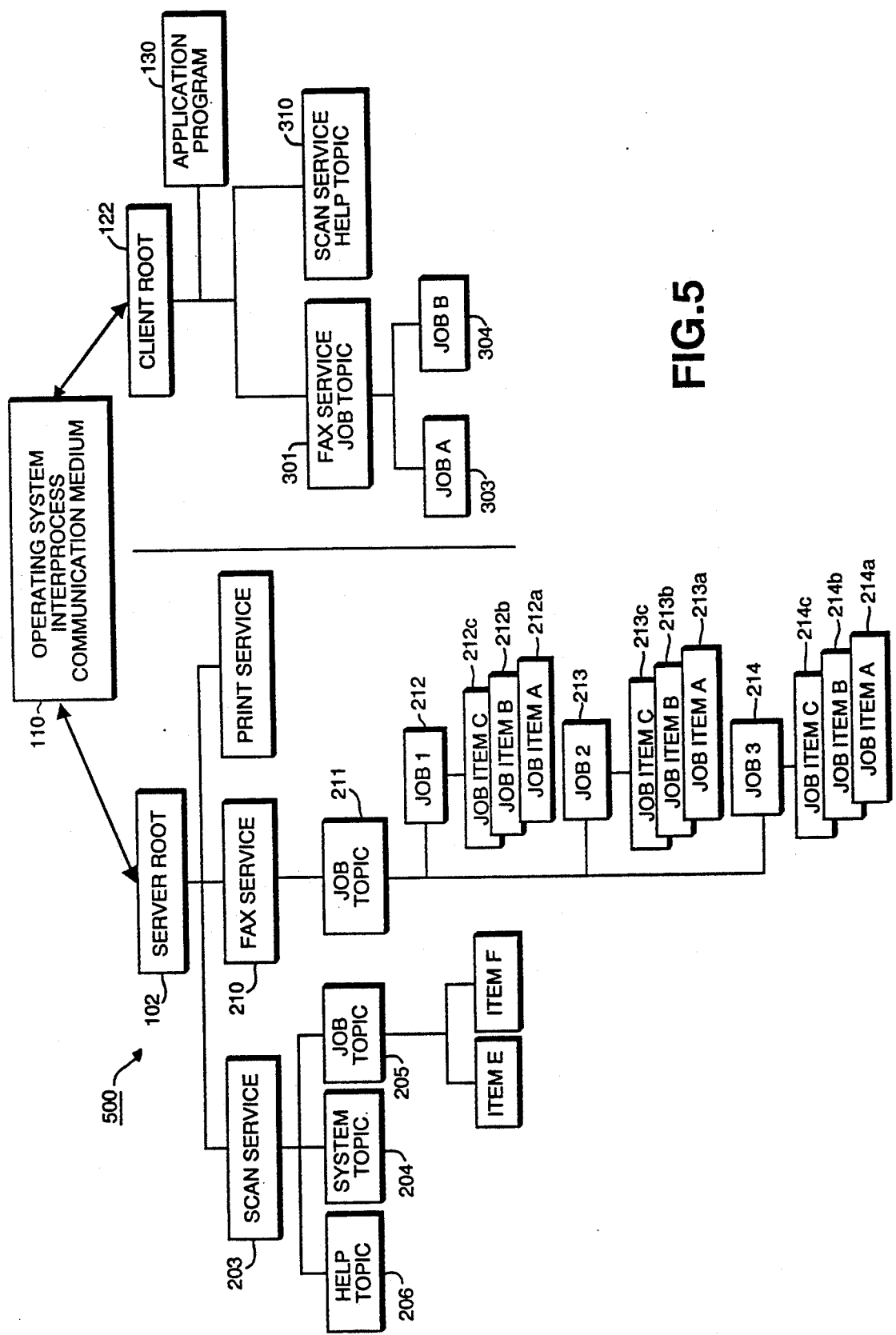
FIG. 5 is an illustration of a self-generating nodal network according to the present invention implemented in a networked system.

A detailed description of the functional capabilities of a server root and a client root will be given in detail in connection with FIGS. 3, 4, and 5, respectively, and with respect to a representative self-generating node network constructed in accordance with the invention is shown in FIG. 5.

Figure 3:
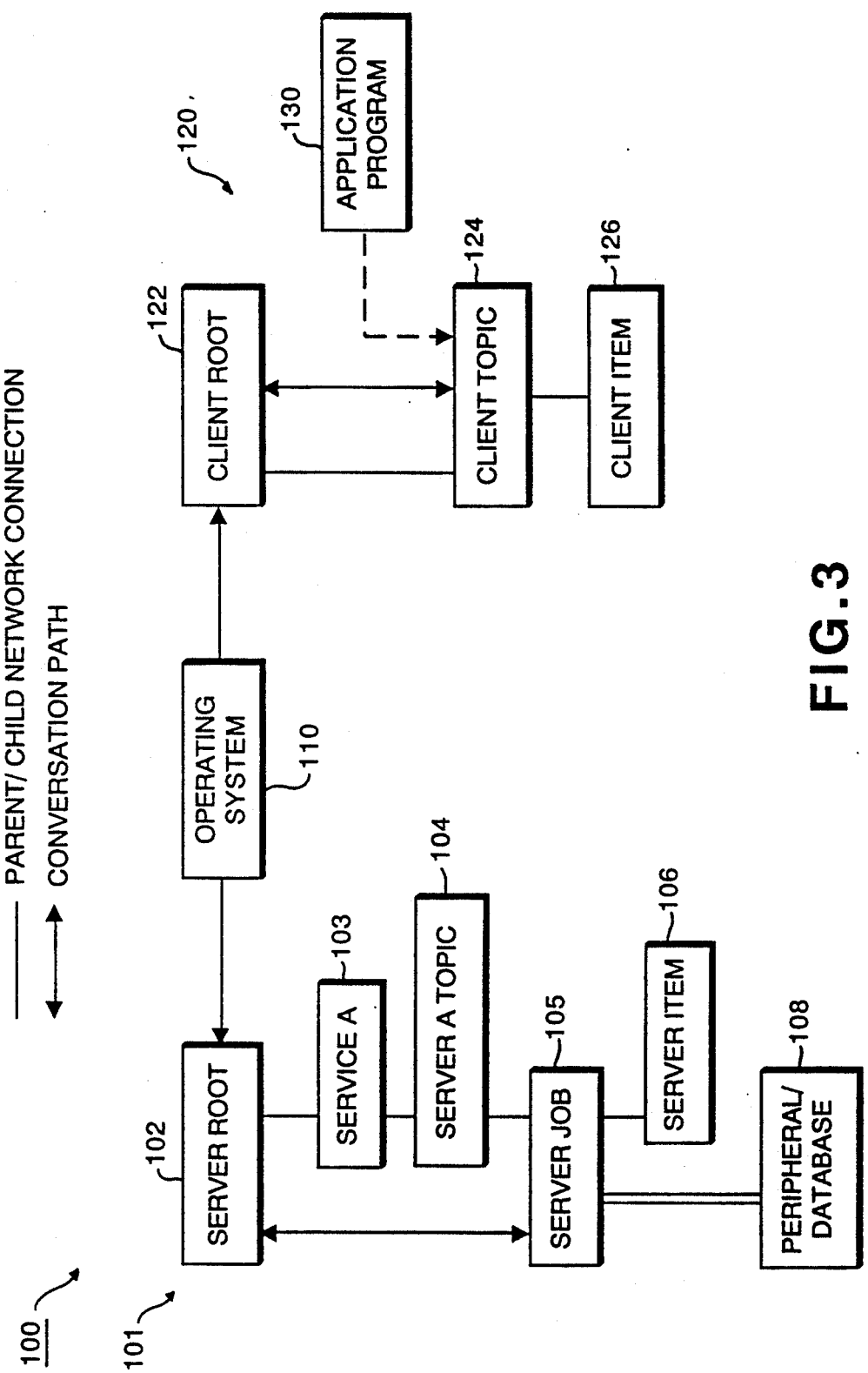
FIG. 3 is a general representational view of the client/server communication system of the present invention.

FIG. 3 is a general representational view of the client-/server communication system of the present invention. As shown in FIG. 3, server root node 102 is a node which comprises a process but also contains a list of nodes contained within the server node network. The process aspect of the server root node 102 includes process steps for building service nodes 103. In addition, server root node 101 is provided with communication capabilities for communication to the operating system 110.

Server root node 102 interfaces with the operating system program by passing communication information from/to the operating system from service node 103. (It is noted that the number of service nodes on a server nodal network is only limited by available system resources and that only one service node is mentioned for the purpose of simplifying the description.) Service node 103 advertises a particular server to clients on the network through the operating system 110. For example, service node 103 may be a scanner, printer, or facsimile machine. Service node 103 sends a communication through server root node 102 which communicates through operating system 110. Service node 103 provides service information to server root node 102 which receives queries from clients as to what services are available. Server root node 102 returns the service advertisements from all service nodes in the server nodal network tree 101 to the client.

Service node 103 advertises its particular function as well as server type. Service node 103 receives service information from server topic node 104 which contains information regarding type of server help information, interface information, etc. For example, server topic node 104 would contain such information as the type of printer (i.e., the manufacturer of the printer) and the proper parameters (interface language) which are required to access the device.

Server topic node also creates a server job node 105 to manage each task. Server job node 105 creates a server item node for each item within the task requested by the client. Server item node 106 contains a single piece of information specific to the requested task. For example, in the case of sending a facsimile message, server item node 106 may contain only one of the following: a database file name for retrieving the facsimile message, routing information, or a parameter for printing the message such as height, width or line spacing. Accordingly, server job node 105 creates as many server item nodes as there are parameter items for a task.

Upon initialization of the program of the present invention, the self-generating server nodal network portion of the client/server communication system is built. First, server nodal network tree 101 is created from the root node. Server root node 102 interfaces directly with operating system 110. Server root node 102 is created as a process provided with both communication capabilities and a listing of pointer tags which designate server nodes of the server tree. That is, server root node 101 utilizes these pointer tags to retrieve from initialization file 111 (not shown) process programs for each peripheral device which is a part of the server tree.

Server root node 102 builds only one server branch of the tree at a time. Each server branch of the tree represents an operation function of each of the peripheral devices in the network. After each server branch has built its last node, server root node 102 grows the next server branch until the tree is fully populated with server branches for that network.

In order to build a first branch of the server tree, server root node 102 utilizes one of the pointer tags provided within its listing to retrieve service node 103 from initialization file 111. Service node 103 is primarily a process, but also contains a node list from which it retrieves and builds the next node in the branch. The process aspects of service node 103 include process steps for building an additional node as well as process steps for advertising a particular server to server root node 102. That is, service node 103 has the ability to advertise the type and function of a server to server root node 102. Service node 103 further includes communication capabilities to communicate to the parent node, namely, server root node 102. Since service node 103 does not contain communication capabilities to communicate directly with operating system 110, it is necessary for service node 103 to pass its service advertisement to the communication capabilities of the parent node. Since server root node 102 is the parent node and it can only communicate the operating system 110, the advertisement from service node 103 will be passed to the operating system 110 in order to have the server advertisement passed onto the client nodal network tree. In the present implementation, a client sends a query to the server nodal network requesting the types of services available. Server root node 102 will return the advertised services to the client from each service node in the network.

Service node 103 builds its portion of the nodal network tree by retrieving server topic node 104 from initialization file 111. Server topic 104 is primarily a process, but it also contains a pointer tag which points to the location of the next node in the nodal network, namely, server job 105. In addition, server topic node 104 includes process steps for providing a particular type of server function information to the service node. The process aspects of server topic 104 includes process steps to provide the specific parameters of the peripheral device as well as process steps to communicate with the parent node.

Server topic 104 builds its portion of the nodal network by retrieving server job 105 from initialization file 111. Server job 105 includes process steps for building an additional node, process steps for accessing the peripheral device with the actual process steps and attributes needed to operate the peripheral device. The process aspect of server job 105 include process steps of communicating with the parent node, namely, server topic node 104. Server job node 105 manages a conversation with a client allowing a client to control a peripheral device.

Upon completing a branch of server tree 101, server topic 104 returns control to service node 103. Service node 103 which receives an end-of-branch indication, returns control to server root node 102. The foregoing process is performed for each of the servers in the server nodal network until the entire server tree is complete. When server root node 102 receives the last end-of-branch indication from the server branch created last, server root node 102 generates a signal to the operating system indicating that the server nodal network is complete. In response to the completion signal, a command may be issued from the operating system 110 to server root node 102 to initiate accepting task requests for servers within the server tree.

Once server nodal network tree 101 has been created and the signal indicating that server nodal network tree 101 is complete, client server nodal network tree 120 is then created in a similar manner to server nodal network tree 101. However, it is noted that client nodal network tree 120 also may be created either simultaneously with or before the server nodal network tree 101. A detailed description of the process of creating client nodal network tree 120 will now be discussed with reference to FIG. 3.

Upon receiving the completion signal from server nodal network tree 101, the program application of the present invention creates a client root node. Client root node 122 is primarily a process with both communication capabilities to communicate with operating system 110 and process steps for creating client topic nodes 124.

Client topic node 124 includes process steps for requesting a job directly from application program 130. Each client topic node 124 is associated with a specific server. In this regard, each client topic node 124 has a corresponding server topic 104 in the server nodal network tree 101. For example, if there exists a printer server on the network, there will exist server topic 104 as well as client topic node 124 associated therewith for sending requests to that particular server. In addition, client topic node 124 includes process steps for creating client item node 126. Client item node 126 includes pertinent information for performing a specific job. For example, client topic node 124 includes information regarding the number of pages to be printed, font type, paper size, etc. In this regard, client topic node 124 receives job requests from the application program with the specifics for carrying out the required task.

Client topic node 124 further includes communication capabilities to communicate to the parent node, namely, client root node 122. Since client topic node 124 can not communicate directly to operating system 110, it is necessary to client topic node 124 to pass the client request from client item node 126 to client topic node 124 and then onto client root node 122 for it to be propagated through operating system 110.

The foregoing discussion of client nodal network tree 120 has been described as having client root node 122, client topic node 124, and client item node 126. However, client nodal network tree 120 may take on a different structural appearance so as to correspond directly to each of the server nodes in the server nodal tree. It is also to be understood that for each server in the server nodal network, there is a corresponding client topic 124. The foregoing discussion with regards to one client topic node has been provided only for the purpose of brevity.

The present application program has the capability of scheduling tasks by providing scheduling queues. As shown in FIG. 4, server root node 102 is connected to two queues, ready-queue 140 and timer-queue 142, which handle scheduling and timer call-back services, respectively. These queues contain pointers to server jobs such as server job 105. Ready-queue 140 and timer-queue 142 do not contain the server job node itself, but rather contain a pointer to that server job node. The pointer is used for issuing a ready-event command in the case of ready-queue 140 or a timer-event command in the case of timer-queue 142 to the respective address of the server job node.

Ready-queue 140 has the ability to schedule execution of each server job node which is scheduled for immediate execution in a round-robin fashion. For example, after the server job node has set up the requested task, server job node 105 sends a signal back through server root node 102 to client root which is then routed to client topic node 104 to indicate that the task is ready to be executed. Client topic node 104 issues an execute command back through the client node network 101 to server root node 102. Server root node 102 sends the command directly to server job node 105. Server job node 105 examines the command to execute in order to determine if the command is for immediate execution of the task or for a time-delayed execution of the task. In accordance with the determination, the server job node 105 identification is registered with either or both the ready-queue 140 and timer-queue 142.

In the case that the task is for immediate execution, then it is registered with ready-queue 140. That is, the identification of server job node 105 is registered with ready-queue 140. While monitoring each server, ready-queue 140 manages each task on a first-in, first-out manner. In particular, ready-queue 140 monitors the operation status of requested servers to determine the availability for executing tasks and, upon determining that a server is available to execute a task, ready-queue 140 issues a ready-event signal to the server job node 105 based on the stored identification in order to execute the server job. Once the command is issued from ready-queue 140, the server job identification is erased from ready-queue 140.

Timer-queue 142 schedules execution of server job nodes in accordance with a scheduled time which has been registered with the server job node identification. Timer-queue 142 utilizes a call-back method by which it is able to call on the server item node when the time arrives for execution. For example, as shown in FIG. 4, timer-queue 142 is connected to server root node 102 for managing tasks to be executed. Timer-queue 142 is a task manager for executing tasks at designated times in the future. In the case server topic node 104 receives a command to execute the task stored in the server job node 105, server job node 105 will register a job identification with timer-queue 142. Timer-queue 142 tracks each of the jobs to be performed based on their identification as well as the time for the job to be executed. In the present case, server job node 105 would have its identification registered with timer-queue 142 so that when its time for executing has been reached, timer-queue 142 will send a timer-event signal back through server root node 102 to server job node 105 to indicate its scheduled execution. Server job node 105 will then in turn send the stored information in each server item 106 to peripheral device 108 for execution.

Queuing a server job node does not affect the position of the job with respect to server topic node 104. As discussed previously, server job node 105 remains physically as a child node of the parent node and only its pointer is registered with either or both ready-queue 140 and timer-queue 142. For example, in FIG. 4, server topic node 104A has two server jobs Job A1 and Job A2 which are registered with ready-queue 140. Server topic node 104B has no jobs in either ready-queue 140 or timer-queue 142. As shown in FIG. 4, server topic node 104C has three jobs. Job C1 is registered with ready-queue 140 and Job C2 and Job C3 are registered with timer-queue 142. As shown, each server job under each server topic node remains as a child within the child list of each parent topic node because only the job identification is registered with the queue. When a job has been called by either ready-queue 140 or timer-queue 142, upon its completion it is removed from the queue and correspondingly from beneath the child list under the parent node.

In addition to ready-queue 140 and timer-queue 142, the system also includes system queue node 152. System queue node 152 contains information regarding the status of all server jobs currently listed with ready-queue 140 and timer-queue 142.

As shown in FIG. 4, server nodal network tree 101 includes service system node 150 which receives routed listings of all jobs queued from both ready-queue 140 and timer-queue 142. The list of jobs queued from both ready-queue 140 and timer-queue 142 are updated as jobs are completed as well as when jobs are created. These listings are routed to system queue 152 which is a child node created by service system node 130.

Since the status of all servers within server nodal network tree 101 are stored in a central system queue, a client can monitor jobs, in real time, which are to be executed by each server in the system. For example, a request for the status of scanner 22 is received by server root node 102 and routed to service system node 150 which, in turn, sends the request to system queue node 152. System queue node 152 responds to the request by sending all current listings for scanner 22 from both ready-queue 140 and timer-queue 142. This information is sent back through service system node 152 which, in turn, sends the requested information back to the client via server root node 102. Thus, it is possible to monitor the status of the entire system by either requesting the status of specific servers within the server nodal network or by requesting the status of all of the servers within the nodal network tree.

A more detailed discussion of the operation of the self-generating nodal network for a client/server communication system will be discussed with reference to FIG. 5.

FIG. 5 is an illustration of a self-generating nodal network 500 which includes server root nodes, client root nodes, topic nodes and job nodes as shown and as discussed with reference to FIG. 3. For purposes of nodal network 500 illustrated in FIG. 5, it will be assumed that the network includes a scanner, a facsimile machine, and a printer wherein these items correspond to the peripheral devices illustrated in FIG. 1. For purposes of brevity, the following discussion of the operation of the present invention will be discussed only with respect to facsimile operations of the system.

In operation, application program 130 requests a facsimile operation task to be performed. Application program 130 sends the request directly to fax client node 301. Fax client topic node 301 creates fax client job node 303 for that particular fax job. In the present example, fax client job node 303 will be referred to as jobA. JobA contains the relevant information for requesting the given fax job. JobA also contains information to communicate directly with fax client topic node 301 in order to pass on the requested information. Upon receiving the request and communication information, fax client topic node 301 communicates the request to client root node 122 which contains the communication capabilities for sending the request through operating system 110.

Operating system 110 sends the request for a fax job with all the pertinent routing information to server root node 102. Server root node 102 receives the request with the pertinent routing information and routes the request directly to fax service node 210. In the present case, fax service node 210 has advertised its service to server root node 102 as a facsimile machine and, more particularly, a particular manufacturer's facsimile machine which may be the requested type of facsimile machine to use for sending the requested fax.

Upon receiving the request, fax service node 210 passes the job request to server topic node 211. Server topic node 211 creates job node 212 for managing the request and to provide the client with access to the peripheral device. That is, job node 212 has all of the pertinent access information for accessing the peripheral device and data files. In turn, job node 212 creates job items 212A, 212B, and 212C for each item within the requested task.

In more detail, fax client topic node 301 sends the request to client root 122 to be send through operating system 110. Upon receipt of the request, server root node 102 routes the request to the designated service. In the present example, fax server 210 is the designated service to perform the function. Fax server 210 receives the request and the parameters such as data file identification number, page breaks, etc., for performing a task from server root 102. Fax service node 210 passes the request and the parameters to server topic node 211. Server topic node 211 creates a fax server job 211 to perform the function of creating a fax job item 212 which will contain the information for retrieving the data from the data file (which may contain the fax message as well as the phone number for the fax designation) and other pertinent parameters for setting up the message. In addition., fax server job 211 will include all of the pertinent information for interfacing directly with the peripheral device.

Once fax job item 212 is created, fax server job 212 sends a task-created-signal back directly to the server root node which is then sent through operating system 110 back to fax client topic node 301. Upon receiving the indication that the task has been created, fax client topic node 301 returns an execute command. The execute command is sent back through operating system 110 to server root node 102 and it is directed to fax server job 212. Fax server job 212 examines the command node to determine whether to register the fax server item with either or both ready-queue 140 and timer-queue 142. Based on the determination, fax server item 212 is registered with either read-queue 140 or timer-queue 142 for execution. After each item has been executed, an execution completion signal is sent back through the server root node 102 to fax client topic node 310 indicating a completed task.

While it is possible to perform requested tasks utilizing the above-described nodal network system, it is also possible to determine the status of a peripheral device. As shown in FIG. 5, scan service node 203 has a child node, system topic 204. System topic 204 provides status information regarding operation of scanner 22. For example, an application program may request the current status of scanner 22 or may request the past operation status, such as the number of scans performed within the last week, the number of scans are scheduled for today, etc. This status information can be routed back to client root node 102 to the requested information from scan topic node 310.

Additionally, each service node can be provided with help topic node 206 as shown with respect to scan service 203. Help topic node 206 provides information regarding the use of scanner 22. For example, help topic node 206 provides information regarding interface instructions for scanner 22 as well as scanner 22 operation capabilities such as the number of dots-per-inch and scans made per scan line. While the foregoing are merely examples of types of nodes created in the nodal network, there may also be provided other nodes which perform other tasks. In addition, nodes may be added to provide further functions or may be deleted as desired.

What is claimed is:

1. In a computerized system having an operating system for controlling peripheral servers, a computer-implemented method for building a self-generating nodal network which includes a server nodal network tree and a client nodal network tree for communicating between client and server, the method comprising the steps of:

generating a server root node which includes both process steps of communicating with the operating system and with service nodes, and process steps for building the service nodes which correspond to peripheral servers within the computerized system;

creating a server nodal network tree by causing the server root node to build the service nodes which comprise the server nodal network tree, each service node including both process steps for advertising a peripheral service to the server root node and process steps for building a topic node which in turn includes process steps for accessing a peripheral server and process steps for building a job node for storing a job request;

generating a client root node which includes both process steps for communicating with the operating system and with client service nodes; and creating the client nodal network tree by causing the client root node to build the client service nodes which comprise the client server nodal network tree, each client service node corresponding to each service node of the server nodal network tree, and each including both process steps for communicating with an application program and process steps to create a job request in accordance with an input client request designated by the application program.

2. A method according to claim 1, further comprising a step of creating job managing queues for managing a job to be executed.

3. A method according to claim 2, wherein the step of creating job managing queues includes the step of creating a ready-queue for managing job requests to be executed immediately and includes the step of creating a timer-queue for managing job requests to be executed in the future.

4. A method according to claim 3, further comprising the step of creating a system queue for maintaining the status of all job requests in the client/server system managed by the ready-queue and the timer-queue, wherein the status is accessible by the application program for monitoring the client/server system.

5. A method according to claim 1, further comprising the steps of receiving at the client service node a job request from the application program and propagating the request back through the client nodal network tree to the server nodal network tree for execution.

6. A method according to claim 5, further comprising the step of utilizing the self-propagating nodal network by issuing a job request to a client service node which directs a request to a service node corresponding to a server for performing the job request, wherein the job request is propagated by the client root node through the operating system to the server root node within the server nodal network tree.

7. A method according to claim 1, wherein the job node includes process steps for instructing a corresponding peripheral device to execute a job.

8. A method according to claim 1, further comprising the step of advertising a peripheral service wherein the step of advertising includes a providing peripheral server information, which includes a particular peripheral server function and peripheral server type, to the service root node, which in turn transmits the advertisement through the computerized system, whereby, once the server nodal network tree and the client nodal network tree are created the step of advertising is initiated.

9. A method according to claim 1, further comprising the step of building a topic node, wherein the step of building a topic node includes providing peripheral server function information to the service node and communication capabilities between the service node and the topic node, whereby once the server nodal network tree and the client nodal network tree are created, peripheral server function information is provided to the service node to be advertised to the server root node.

10. A method according to claim 1, further comprising the step of building a job node, wherein the step of building a job node includes accessing the peripheral server with process steps and attributes associated with the peripheral server, communicating with the topic node, and managing a conversation with the client service node which requested a job, whereby, once the server nodal network tree and the client nodal network tree are created, each client service node is capable of receiving input client requests from the application program and is capable of propagating the requests back through the client nodal network tree to the server nodal network tree for execution by the topic node.

11. In a networked system having network peripheral server work stations, a computer-implemented method for creating a self-generating nodal network for communicating between server work stations and for executing client request input from an application program using one of the server work stations capable of performing the corresponding input client request, the computer-implemented method comprising the steps of:

retrieving from a networked file server a root node which includes both process steps for creating a server nodal network tree and process steps for creating a client nodal network tree, which in combination produce the self-generating nodal network;

processing the process steps that create the server nodal network, which upon being created, includes process steps for generating a server root node for communicating with an operating system and with other service nodes in the server nodal network, and for building service nodes which correspond to a server within the networked system, wherein each service node, upon being built, includes both process steps for advertising a service for rendering a specific task to the server root node and process steps for building a job node for storing a job request in response to an input client request sent in response to the service advertisement; and processing the process steps to create a client nodal network tree which includes the steps of generating a client root node, which upon being generated, includes both process steps for communicating with the operating system and with other client nodes in the client nodal network tree and process steps for building client service nodes corresponding to each service node of the server nodal network tree, wherein each client service node, upon being built, includes both process steps for communicating with the application program and process steps to create a job request in accordance with an input client request designated in the application program, whereby, once the server nodal network tree and the client nodal network tree are created, each client service node is capable of receiving input client requests from the application program and is capable of propagating the request back through the client nodal network tree to the server nodal network tree for execution by one of the server work stations.

12. In a computerized system having an operating system for controlling peripheral servers, an apparatus for building a self-generating nodal network which includes a server nodal network tree and a client nodal network tree for communicating between client and server and for executing client requests from an application program, comprising:

input means for inputting a client requests from the application program;

memory means for storing process steps for creating a nodal network; and process means 1) for generating a server root node, in accordance with the stored process steps, which includes both communication capabilities for communicating with the operating system and with service nodes, and capabilities for building the service nodes which correspond to peripheral servers within the computerized system, 2) for creating the server nodal network tree by causing the server root node to build the service nodes which comprise the server nodal network tree, each service node having capabilities for advertising a peripheral service to the server root node and building capabilities for building a topic node which in turn includes capabilities for accessing a peripheral server and capabilities for building a job node for storing a job request, 3) for generating a client root node which has capabilities for communicating with the operating system and with client nodes and capabilities for building client service nodes corresponding to each service node of the server nodal network tree, and 4) for creating the client nodal network tree by causing the client root node to build the client service nodes which comprise the client server nodal network tree, each client service node including a capability to communicate with an application program and a capability to create a job request in accordance with an input client request designated by the application program.

13. An apparatus according to claim 12, wherein the memory means stores process steps to create job managing queues for scheduling execution of a job input from the application program, and whereby the process means, in accordance with the stored process steps, creates the job managing queues.

14. An apparatus according to claim 13, wherein the job managing queues include a ready-queue for managing job requests to be executed immediately and include a timer-queue for managing job requests to be executed in the future.

15. An apparatus according to claim 14, wherein the memory means stores process steps to create a system queue for maintaining the status of all job requests in the client/server system which are being managed by the ready-queue and the timer-queue, wherein the status is accessible by the application program for the purpose of monitoring the client/server system, and whereby the process means creates the system queue in accordance with the stored process steps.

16. An apparatus according to claim 12, wherein the stored step of advertising a peripheral service includes the step of providing peripheral server information, which includes a particular server function and peripheral server type, to the service root node, whereby, once the server nodal network tree and the client nodal network tree is executed, the process means executes the stored step of advertising.

17. An apparatus according to claim 12, wherein the stored step of building a topic node includes providing peripheral server function information to the service node and providing communication capabilities between the service node and the topic node, whereby the process means executes the stored step of building a topic node after building the service node.

18. An apparatus according to claim 12, wherein the stored step of building a job node includes the steps of accessing the peripheral server with process steps and attributes associated with the peripheral server, communicating with the topic node, and managing a conversation with the client service node which requested a job, whereby, once the server nodal network tree and the client nodal network tree are created, each client service node is capable of receiving input client requests from the application program and is capable of propagating the requests back through the client nodal network tree to the server nodal network tree for execution by the topic node.

* * * * *